July 30, 1929.  J. J. BARRY  1,722,450
TRIMMING TOOL
Filed Sept. 18, 1925   2 Sheets-Sheet 1
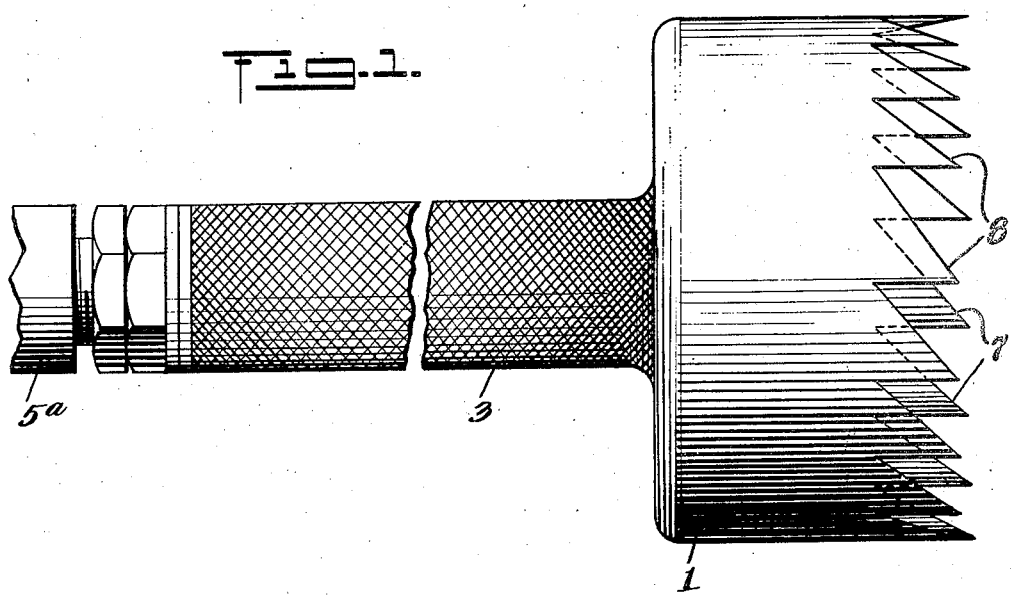
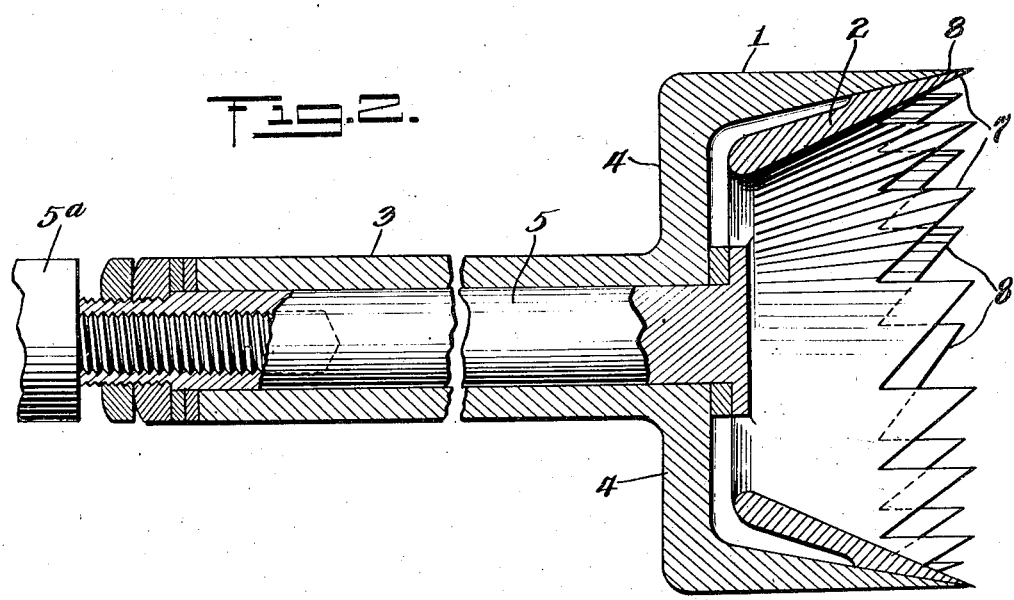
INVENTOR
James J. Barry
BY
King + Schlatt
ATTORNEYS July 30, 1929.  J. J. BARRY  1,722,450
TRIMMING TOOL
Filed Sept. 18, 1925  2 Sheets-Sheet 2
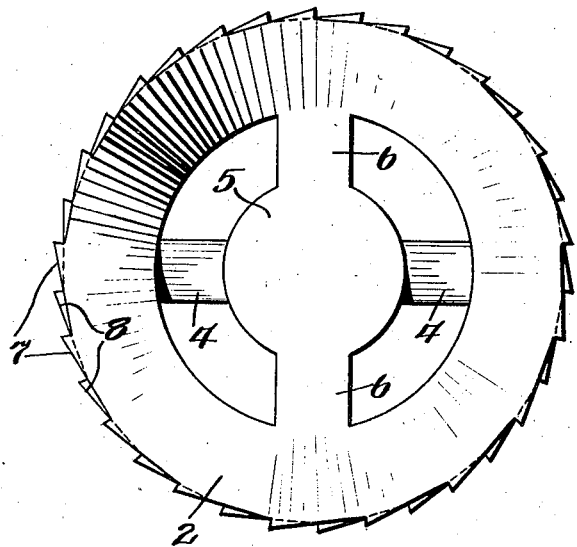
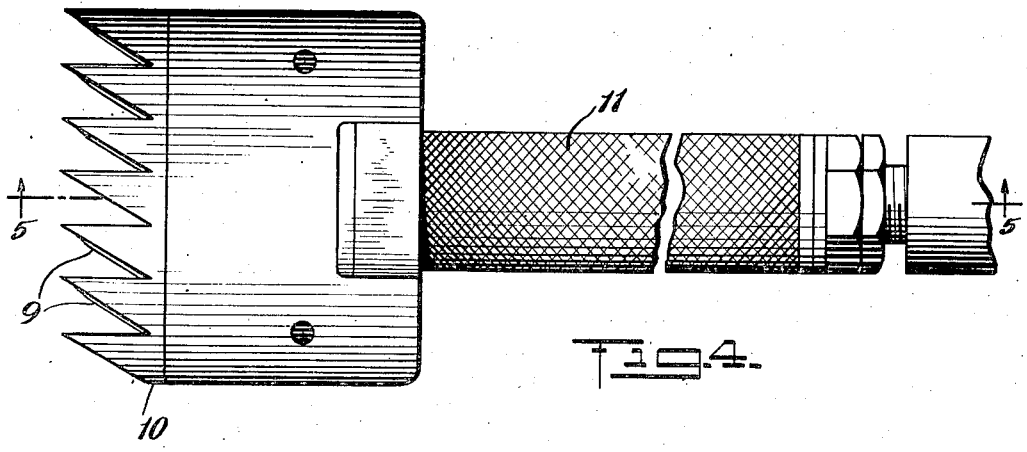
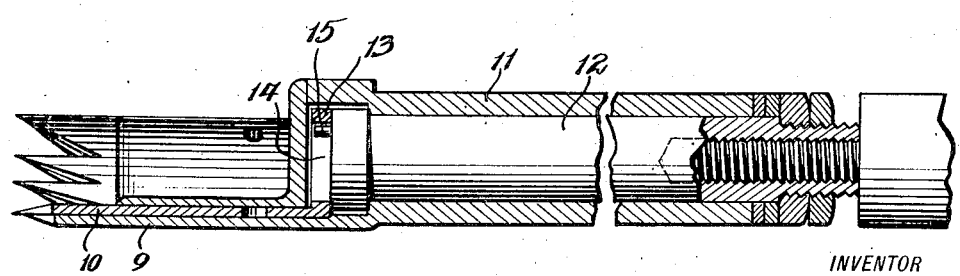
INVENTOR
James J. Barry
BY
King & Schlatt
ATTORNEYS Patented July 30, 1929.

1,722,450

UNITED STATES PATENT OFFICE.

JAMES J. BARRY, OF GLOUCESTER, MASSACHUSETTS, ASSIGNOR TO GENERAL SEAFOODS CORPORATION, OF GLOUCESTER, MASSACHUSETTS, A CORPORATION OF MASSACHUSETTS.

TRIMMING TOOL.

Application filed September 18, 1925. Serial No. 57,049.

This invention relates to trimming tools and more particularly to such tools which are power driven, and intended more especially for use in connection with trimming fish.

The objects of the invention are to provide a machine which will trim fish with least waste and effort; to provide a trimming tool of such character which is adapted to be power operated, as by an electric motor; to provide a curvilinear cutting edge; to provide a curvilinear displacement of the movable cutting member with respect to the fixed cutting member; to enable the cutting member to be moved in either direction and cut during movement either way with equal facility; to obtain both a sawing and a cutting action; to provide a construction wherein the movable member may rotate; to provide for discharge of the trimmings; to secure simplicity of construction and operation, and to obtain other advantages and results as may be brought out in the following description.

Referring to the accompanying drawings in which like numerals of reference indicate similar parts throughout the several views;

Figure 1 is an outside elevation of a tool embodying my invention;

Figure 2 is a longitudinal section through the same;

Figure 3 is an end view looking toward the cutting edge;

Figure 4 is an elevation of a modified construction of trimming tool; and

Figure 5 is a sectional view on line 5—5 of Figure 4.

In the specific embodiment of the invention illustrated in said drawings, and with particular reference at this time to Figures 1, 2 and 3, the reference numeral 1 indicates a relatively fixed cutting member and the reference numeral 2 indicates a movable cutting member. In the present showing these cutting members are preferably curvilinear with one fitting within the other. Also, the present showing contemplates the outer cutting member to be the relatively fixed one and the inner member to be the movable one. Preferably also, the two said members are cylindrical in nature, open at both ends, but I do not confine myself to any of these details.

At the inner end of the outer or relatively stationary member 1 is a knurled handle 3 extending rearwardly preferably axially with respect to the said member. However, it is to be understood that any other suitable handle may be employed which will enable the operator to manipulate the tool to best advantage. Since the cutting members in the present disclosure are shown as open-ended, said handle is attached to the inner or rear end of the fixed cutting member by one or more spokes 4, as one means of support.

Handle 3 is hollow as shown and thereby provides a bearing for a shaft 5 to which may be secured a flexible shaft $5^a$ or other suitable power transmitting means from a motor or other source of power (not shown). Said shaft 5 extends through the length of the handle, and at its inner end is secured by a suitable spoke or spokes 6 to the inner edge of the movable cutting member. Other manner of securing the shaft to the cutting member may be employed, particularly where the construction of said member is different. It will be readily appreciated that the operator holding onto handle 3 keeps the outer member from rotating, whereas power applied through the shafts 5 and $5^a$ will obtain a rotary movement of the inner member.

The outer or cutting edges of both members are contiguous to each other and are toothed. Preferably teeth 7 on the rotating member project slightly beyond teeth 8 of the relatively fixed member. This, however, may be otherwise if found more desirable. The teeth on each member are preferably similar, each tooth providing one side substantially perpendicular to the plane of the outer edge and the other side sloping. The teeth of each member are similarly arranged, that is, with the perpendicular sides facing the same way. As a result, the movable member may be rotated either way and obtain a cutting or shearing action between the teeth by a closing together of a perpendicular edge and a sloping edge. Accordingly, as the teeth get dull on one edge, the motor can be reversed and the other edge of the teeth used for cutting purposes. It is to be observed that with the movable teeth projecting slightly beyond the other teeth, a sawing action will take place particularly when tough membranes or bones are encountered which are too wide to enter between adjacent points of the teeth. The arrangement likewise secures a combined sawing and cutting action which is exceedingly advantageous for rapid operation.

It may here be noted that the construction of a tool utilizing a rotary cutting member provides an arcuate cutting edge, which I find is particularly advantageous in trimming fish. The arrangement enables the operator to gouge out the bone or other undesirable matter with least waste of the edible portion of the fish.

This same arcuate cutting edge for the cutting members may likewise be obtained without necessitating complete rotation of the movable member. In such case, it would not be necessary to have said cutting members complete cylinders. Carrying out these modifications of the invention, I have shown in Figures 4 and 5 a fixed cutting member 9 having a movable cutting member 10 contiguous thereto. Both of said members are curvilinear, as shown, on a radius suitable for the work to be performed. From the fixed member extends a knurled handle 11 through which extends a drive shaft 12. At the end of said shaft 12 next the cutting members is suitable means for oscillating the movable member, the present disclosure providing an eccentric pin 13 revolved by the shaft, the pin operating in a vertical slot 14 in a lug 15 on the movable member. As indicated above, the cutting members in this construction do not have to be complete cylinders, and if they are complete cylinders, they may be provided with teeth only part way around. I accordingly do not confine myself to use of only a portion of a cylinder as shown for illustrative purposes in Figures 4 and 5. As in preferred embodiment of the invention described above, the members are provided with teeth one series of which projects slightly beyond the other, the teeth each having one perpendicular side and one sloping side arranged to effect the cut by a closing together of a sloping side and a perpendicular side.

Obviously other detail changes and modifications may be made in the manufacture and use of my improved trimming tool without departing from the spirit or scope of the invention, and I do not wish to be understood as limiting myself to the exact construction shown or described except as set forth in the following claim when construed in the light of the prior art.

Having thus described the invention, I claim:—

A trimming tool comprising a relatively fixed cylindrical member, and a rotatable cylindrical member within said fixed member, each of said members having an end cutting edge and the inner curved surface of the outer member and the outer curved surface of the inner member converging toward the end of said members opposite to said cutting edge whereby said members may be maintained in proper cutting relationship as the parts wear.

JAMES J. BARRY.